United States Patent
Yu et al.

(10) Patent No.: US 6,499,894 B1
(45) Date of Patent: Dec. 31, 2002

(54) PUSH KEY WITH REPLACEABLE KEY CAP

(75) Inventors: Ching-Chiang Yu, Keelung (TW); Chih Wen Su, Chung Ho (TW)

(73) Assignee: Behavior Tech Computer Corporation, Taipei (TW)

( * ) Notice: Subject to any disclaimer, the term of this patent is extended or adjusted under 35 U.S.C. 154(b) by 0 days.

(21) Appl. No.: 09/893,282

(22) Filed: Jun. 28, 2001

(51) Int. Cl.⁷ .................................. B41J 5/12; B41J 5/16
(52) U.S. Cl. ...................... 400/495; 400/490; 200/345
(58) Field of Search .................... 400/488, 490, 400/494, 495, 495.1, 472; 200/345; 235/145 R

(56) References Cited

U.S. PATENT DOCUMENTS 2,545,133 A * 3/1951 Bradt ........................ 400/495
5,386,091 A * 1/1995 Clancy ....................... 200/344
6,171,003 B1 * 1/2001 Lo .............................. 400/490

* cited by examiner

Primary Examiner—Leslie J. Evanisko
Assistant Examiner—Jill E Culler
(74) Attorney, Agent, or Firm—Rosenberg, Klein & Lee

(57) ABSTRACT

A key switch having a replaceable key cap is provided. The key switch includes a main key body (10) having a pair of cross-ribs (14). The pair of cross-ribs (14) define a plurality of recesses within the main key body (10). A replaceable key cap (20) has an upper wall and a substantially annular sidewall which define a hollow chamber therein. A plurality of locking members (22) project from a lower surface of the upper wall within the hollow chamber. Each of the locking members (22) has a locking flange projecting therefrom and each of the plurality of locking members (22) is releasably received by a respective one of the plurality of recesses, with the locking flanges releasably engaging respective cross-ribs (14).

1 Claim, 2 Drawing Sheets

PUSH KEY WITH REPLACEABLE KEY CAP

BACKGROUND OF THE INVENTION

FIELD OF THE INVENTION

The invention relates to a push key with a replaceable key cap, particularly to a structure wherein a key cap is coupled to a key cap unit, so the key cap can be replaced conveniently to suit the user's requirements.

BACKGROUND OF THE INVENTION

At present, keyboards are no longer designed to include only alphabet keys, number keys, cursor up, down, left and right keys, and F1~F12 function keys. A variety of keys are now added for multi-media functions. These multi-media keys are normally of a smaller size and installed along the top row of the keyboard.

Conventional push key design, particularly multi-media keys, still employ the approach of regular push keys with the emphasis being on easy production and reduced key height. To the manufacturer, however, the number of push keys produced month by month is in the millions. In cases where some of the key caps are already printed (generally, function signs are printed on the key caps), they cannot be replaced for other purposes, which would result in a significant waste of resources.

Most users, especially young people, sometimes feel the need to change the color of the keys. In that case, the entire keyboard must be changed if it is designed to have conventional keys. They cannot change the keys without changing the whole keyboard unit. In case some keys are designed to suit the user's own definitions, the traditional keys could not be labeled with their individual functions separately.

BRIEF DESCRIPTION OF THE INVENTION

The primary objective of this invention is to provide a push key having a replaceable key cap, comprising a key cap unit and a key cap, wherein the key cap and key cap unit are coupled to each other, so the key cap can be replaced readily.

Another objective of the invention is to provide a push key with a replaceable key cap, wherein the key cap is transparent, so the user can place a label indicating the function of the key inside the key cap, in order to display the function of the key.

Yet another objective of the invention is to provide a push key with a replaceable key cap, wherein the key is transparent, so that a light emitting unit can be installed inside the keyboard to make the keys look bright and beautiful.

BRIEF DESCRIPTION OF DRAWINGS

The drawings of preferred embodiments of this invention are described in following detail to enable better understanding.

DETAILED DESCRIPTION OF PREFERRED EMBODIMENTS

Figure 1:
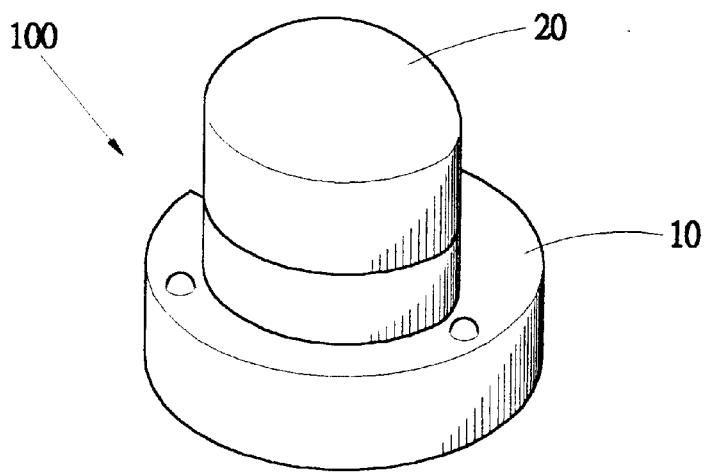
FIG. 1 is a perspective view of the invention.

As shown in FIG. 1, the invention of keyboard key 100 with a replaceable key cap comprises a key cap unit 10 and a key cap 20, the key cap 20 being joined onto the key cap unit 10.

Figure 2:
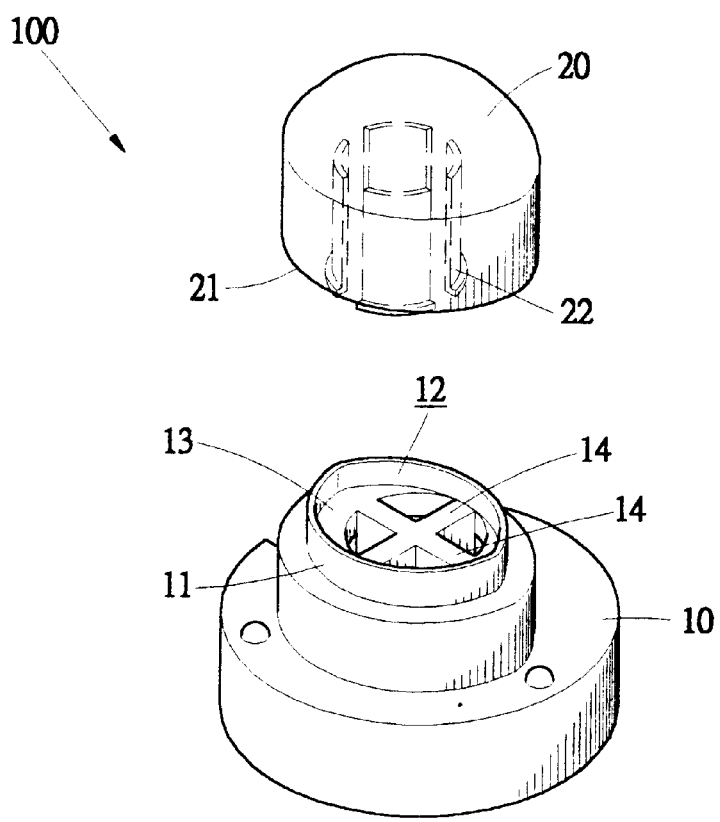
FIG. 2 is an exploded view of the invention.

As shown in FIGS. 1 and 2, on top of the key cap unit 10 is an external ring 11, formed inside the external ring 11 is an accommodating chamber 12, at the bottom of the accommodating chamber 12 is a bottom plate 13, at the center of the bottom plate 13 are several ribs 14.

Figure 3:
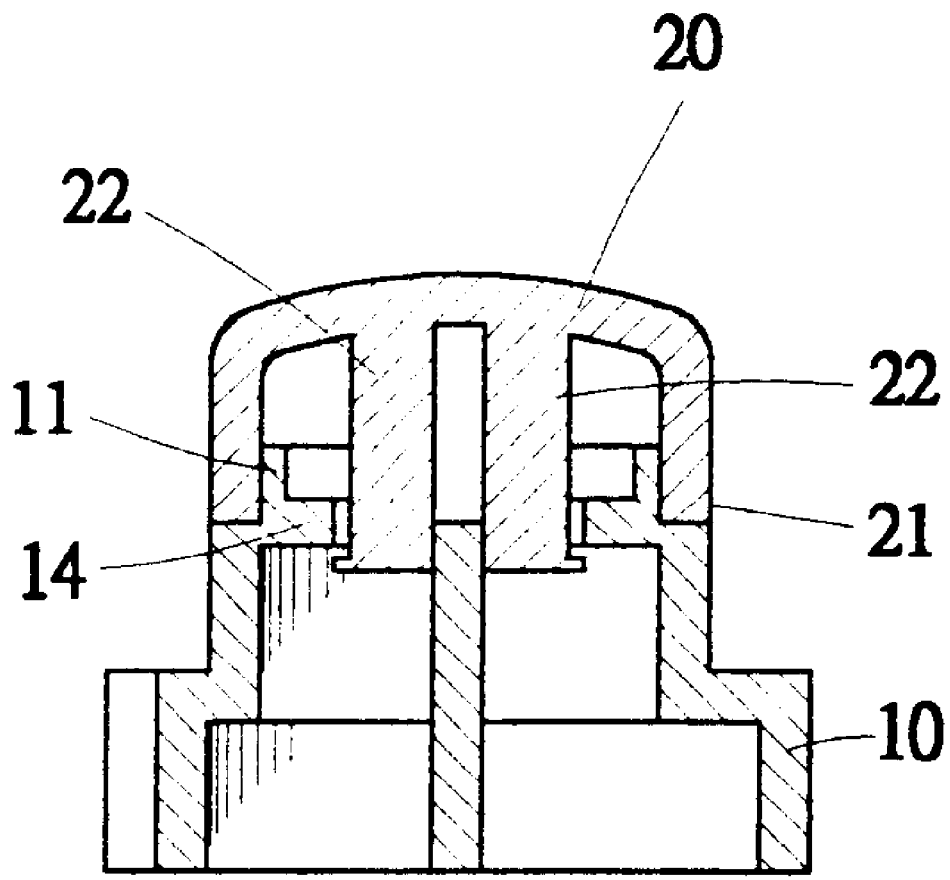
FIG. 3 is a sectional view of the invention.

Below the key cap 20, and in keeping with the shape of the external ring 11, is a coupling unit 21 that can be coupled with the external ring 11. Preferably, the shape of the external ring 11 and the coupling unit 21 are non-circular so that the two units can be effortlessly coupled or separated. Inside the key cap 20 is a key post 22 extending downward, so designed that when the key cap 20 is coupled onto the key cap unit 10, the key post 22 extends into the accommodating chamber 12 of the key cap unit 10, so the key post 22 is fastened to the ribs 14 on the bottom plate 13 (shown in FIGS. 2 and 3).

Since the key cap 20 and the key cap unit 10 can be easily separated and disassembled, the key cap 20 can be replaced at any time. Therefore, when the push keys produced by the manufacturer are modified to suit specific requirements, the key caps 20 can be instantly replaced for ready use. Likewise, the user can feel free to change different key caps 20, of different colors for example, without having to change the entire set of keyboard.

In the same way, when the user tries to redefine the function of the keys, all the user has to do is remove and replace the key cap 20. In the embodiment where the key caps 20 or even the entire key 100 are designed to look transparent, the user will be able to put the label indicating its function inside the key cap 20, so that the user is capable of directly see and understand what function the key is designed for. Furthermore, due to the transparent material, a light-emitting element can be installed inside the keyboard to make the keys look brighter and beautiful.

What is claimed is:

1. A key switch having a replaceable key cap comprising:

a main key body having a pair of cross-ribs, said pair of cross-ribs defining a plurality of recesses within said main key body;

a replaceable key cap having an upper wall and a substantially annular sidewall, said upper wall and said substantially annular sidewall defining a hollow chamber; and, a plurality of locking members projecting from a lower surface of said upper wall within said hollow chamber, each of said locking members having a locking flange projecting therefrom, each of said plurality of locking members being releasably received by respective ones of said plurality of recesses, said locking flanges releasably engaging respective cross-ribs.

* * * * *